June 4, 1963  G. A. LYON  3,092,421
WHEEL COVER
Filed Dec. 12, 1960  4 Sheets-Sheet 1

INVENTOR.
George Albert Lyon
BY Hill, Sherman, Meroni, Gross & Simpson
ATTORNEYS June 4, 1963  G. A. LYON  3,092,421
WHEEL COVER
Filed Dec. 12, 1960  4 Sheets-Sheet 2

INVENTOR.
George Albert Lyon
BY
Hill, Sherman, Meroni, Gross & Simpson
ATTORNEYS June 4, 1963

G. A. LYON 3,092,421

WHEEL COVER

Filed Dec. 12, 1960

INVENTOR.
George Albert Lyon
BY
Hill, Sherman, Meroni, Gross & Simpson
ATTORNEYS June 4, 1963
G. A. LYON
3,092,421
WHEEL COVER
Filed Dec. 12, 1960
4 Sheets-Sheet 4
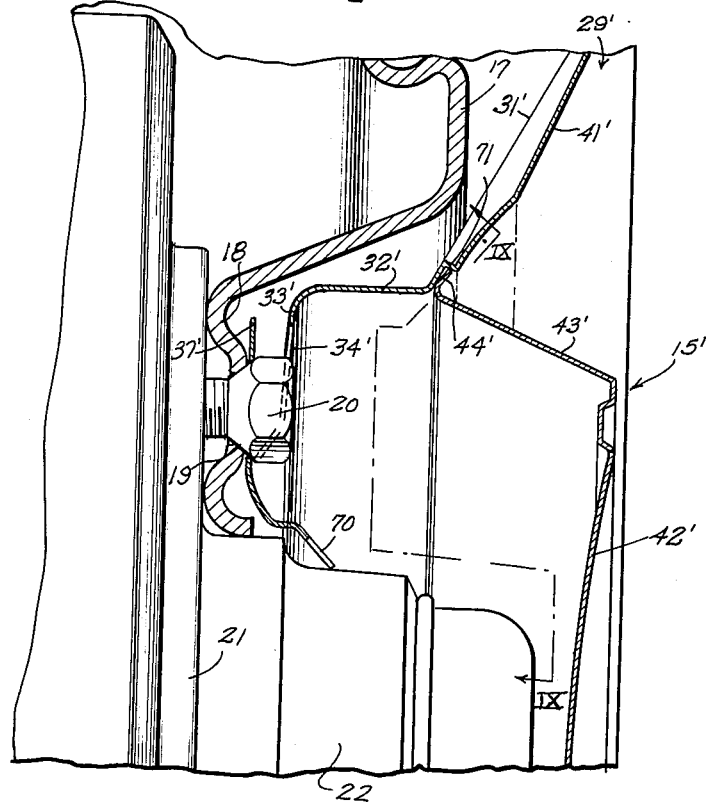
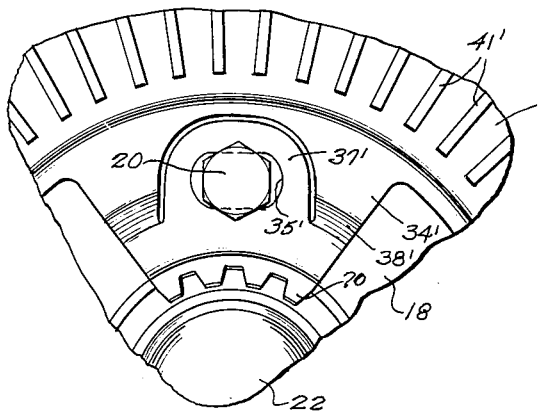
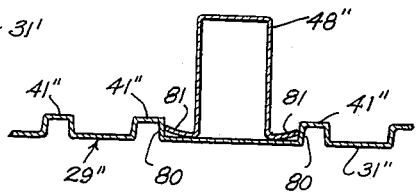
INVENTOR.
George Albert Lyon
BY
Hill, Sherman, Meroni, Gross & Simpson
ATTORNEYS

United States Patent Office 3,092,421
Patented June 4, 1963

3,092,421
WHEEL COVER
George Albert Lyon, Detroit, Mich., assignor to Lyon Incorporated, Detroit, Mich., a corporation of Delaware
Filed Dec. 12, 1960, Ser. No. 75,375
4 Claims. (Cl. 301—37)

The present invention relates to improvements in wheel structures and more particularly concerns the ornamental and protective covering of the outer sides of vehicle wheels.

It is sometimes desirable to provide wheel covers that are attachable to the wheel by means of the cap screws or bolts by which the wheels are secured to the axle structure of the vehicle. It is known that in such attachment of the wheel covers it is advantageous to effect resilient tensioning of the cover or a part thereof as an incident to the attachment to avoid rattling or drumming of the cover in service, especially where the outer margin of the cover is drawn against the tire rim.

However, where the design of the cover is such as to render the same too stiff for any inherent useful flexing incident to the drawing up of the attachment bolts, a problem is encountered.

It is an important object of the present invention to provide new and improved means for resiliently tensionably securing wheel covers to automobile wheels by means of the attachment screws of the wheels.

Another object of the invention is to provide novel means on a wheel cover enabling tensioning of the cover in attaching the same by the attachment screws of the wheel although the cover design is such that there is substantially no resilience in the cover aside from the resilient means.

Another object of the invention is to provide novel means for resiliently attaching a wheel cover at the center of a wheel.

Still another object of the invention is to provide improved two part cover construction wherein a central cap cover member is attached to a central bolt-on type of cover in a new and improved manner.

Other objects, features and advantages of the present invention will be readily apparent from the following detailed description of certain preferred embodiments thereof taken in conjunction with the accompanying drawings, in which:

FIGURE 3 is a fragmentary outer side elevational view of the central portion of the wheel structure of FIGURE 1 with the central closure cap component of the cover assembly removed;

FIGURE 8 is a fragmentary radial sectional detail view on the order of FIGURE 2 but showing still another modification;

FIGURE 9 is a fragmentary elevational detail view taken substantially on the line IX—IX of FIGURE 8; and FIGURE 10 is a sectional detail view similar to FIGURE 5 but showing a modified construction.

Figure 1:
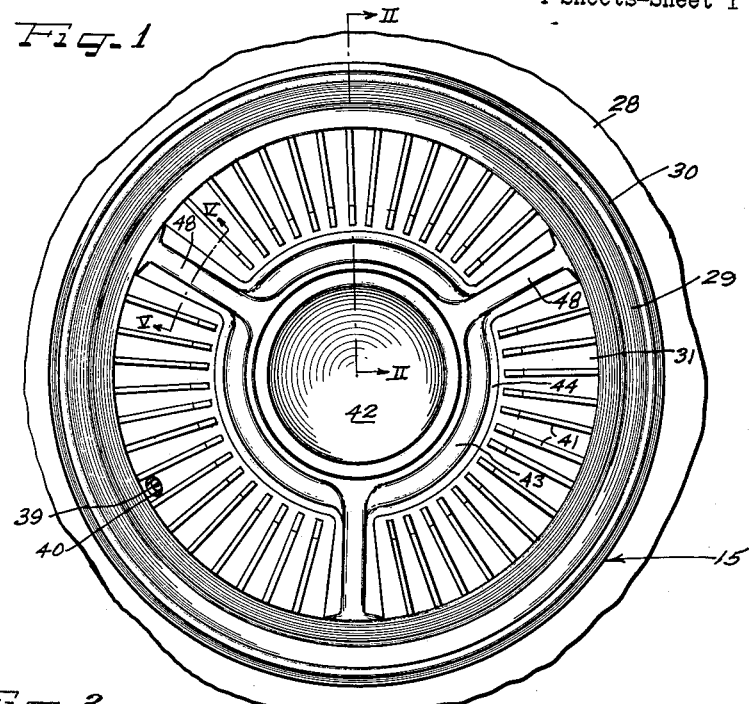
FIGURE 1 is an outer side elevational view of a wheel structure embodying features of the invention.
Figure 2:
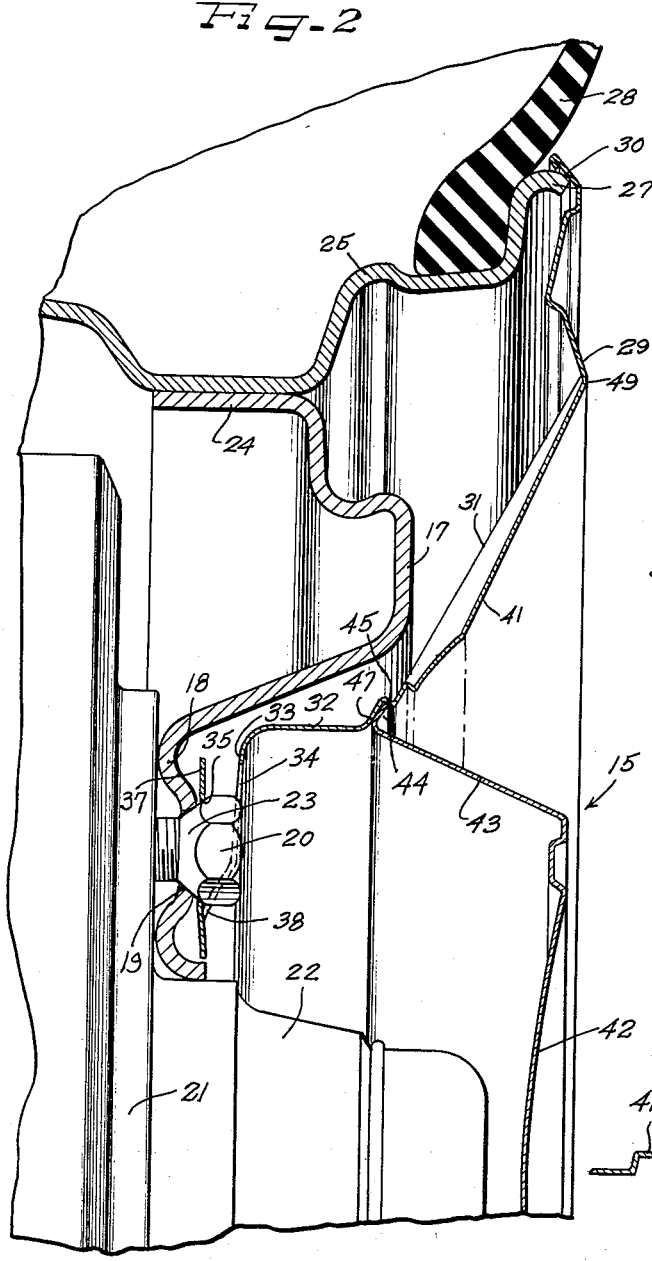
FIGURE 2 is an enlarged fragmentary radial sectional detail view taken substantially on the line II—II of FIGURE 1.

Referring to FIGURES 1, 2 and 3, a cover assembly 15 is constructed and arranged to be applied over the outer side of a vehicle wheel, and more particularly an automobile wheel including a wheel body 17 having a central depressed bolt-on flange 18 provided with a circumferential series of bolt holes 19 through which attachment screws or bolts 20, herein shown as cap screws, are adapted to extend in attaching relation to the attachment flange to secure the same fixedly to a flange 21 of a vehicle axle hub 22. It will be observed that the screws 20 have conical engagement shoulders 23 which thrust against complementary surfaces defining the apertures 19 in fastening the bolt-on flange 18 in place, and normally these conical attachment shoulders 23 are of sufficient width to overlie the opposed outer face of the attachment flange 18 about the bolt holes 19.

About its outer periphery, the disk spider wheel body 17 has an attachment flange 24 which supports a multi-flange drop center tire rim 25 provided with a terminal flange 27 and adapted to support a pneumatic tire 28.

According to the present invention, the wheel cover assembly 15 comprises a cover disk member 29 provided with an outer turned marginal flange 30 which engages about the tip of the terminal flange 27 in a more or less embracing relation to the extent that it assists in maintaining the cover centered on the wheel and also resists diametrical displacement of the cover due to pressure thereagainst or road shocks.

From the radially outer margin 30, the cover member 29 extends generally radially inwardly and has a radially and axially inwardly generally frusto-conical annular portion 31 which overlies the wheel body and joins an axially inwardly extending annular flange portion of a diameter to extend within the wheel body 17 toward the bolt-on flange 18. On its inner terminus, the flange 32 is provided with a continuous annular radially inwardly extending narrow reinforcing flange 33 which in assembly of the cover on the wheel is disposed spaced substantially axially outwardly from the bolt-on flange 18 and is of a diameter at its inner edge to afford ample clearance for the bolts 20 and any wrench socket or head used in manipulating the bolts or cap screws 20. Through the disclosed arrangement, the cover is supported in its axially inward disposition by a part of the wheel located radially outwardly relative to the bolt-on flange, in the present instance by the tire rim flange 27.

In order to secure the cover member 29 in place, means are provided at the center of the cover on the inturned flange 33 for resiliently tensioned coaction with the wheel-securing screws 20 or at least some of them. To this end, a plurality of resiliently axially flexible bolt-on tabs 34 are provided as extensions from the generally rigid central cover flange 33. In this instance the tabs project radially inwardly (FIGS. 2 and 4), and are of smaller number than the number of the wheel attaching screws 20 (FIG. 3). For example, by providing three of the bolt-on tabs 34, with two of the tabs in adjacent relation and one of the tabs 34 in centered diametrically opposite relation to the two adjacent tabs and cut out spaces between the pair of adjacent tabs and the single tab a desirable arrangement is afforded for a five bolt arrangement whereby the vehicle wheel can be preliminarily attached by the two generally diametrically opposite screws or bolts 20 that will remain free from retaining engagement with the cover. Thereafter, the remaining wheel attaching screws 20 are applied in a manner to engage retainingly with the three bolt-on tabs 34.

In utilizing the attachment screws or bolts for securing the cover in place, it is desirable to avoid gripping the sheet material of the cover between the bolt heads and the engaged surfaces of the bolt-on flange of the wheel. There appears to be an undue tendency for the bolts to loosen where there is not direct frictional, thrusting engagement of the bolt head faces with the wheel flange surfaces. For that reason, the bolt-on tabs 34 are constructed and arranged to be engaged operatively by the portions or areas of the bolt head faces 23 which normally remain axially outwardly free from contact with the respective portions of the bolt-on flange 18 of the wheel body about the bolt apertures 19. Accordingly, each of the bolt-on tabs 34 is provided with a bolt aperture 35 which is dimensioned to clear therethrough all of that portion of the face of the securing shoulder 23 of the attaching screw which will engage the shoulder about the bolt-on flange opening 19. This relationship is best visualized in FIGURES 2 and 3. Since it is desirable to permit some rotary or torsional adjustment in placement of the cover on the wheel, the bolt apertures 35 are preferably somewhat elongated circumferentially of the cover while the radially opposite sides of the apertures 35 are reasonably accurately spaced apart to accomplish effective retaining thrusting engagement by the axial outer free portion of the bolt head shoulder face 23.

Figure 4:
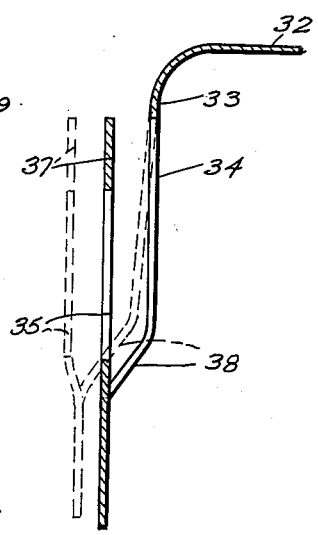
FIGURE 4 is an enlarged more or less schematic sectional detail view of a fragmentary portion of the central resiliently yieldable attachment flange structure of the cover of FIGURE 2.

In order to afford a substantial degree of resilient tensioning of the bolt-on tabs 34, provision is made for substantial axially inward resilient deflection incident to bolting on thereof from a normal axial outwardly spaced relation to the bolt-on flange 18 of the wheel body. Such axially inward deflection is graphically demonstrated in FIGURE 4 on comparison of the normal undeflected condition of the illustrated bolt-on tab and the dot dash showing which represents the axially inwardly resiliently deflected condition thereof resulting from drawing in thereon of the attaching bolt. In other words, the dash outline position in FIGURE 4 is the full line position shown in FIGURE 2.

However, as the bolt-on tab 34 is flexed axially inwardly it swings on an arc which would tend to move the tab radially outwardly and thus throw the bolt aperture 35 into radially outward misalignment which, if not otherwise compensated would result in radially inward drawing and warpage of the contiguous portions of the central flange structure of the cover member since the sheet metal of the cover member is the yieldable substance as compared to the attaching bolt. Herein any such tendency toward misalignment is compensated by providing the bolt-on tab 34 in each instance with a partially severed relatively resiliently flexible attachment tongue 37 containing the bolt aperture 35. As best seen in FIG. 3, the attachment tongue 37 in each instance is partially severed from the tab 34 on a generally U-shaped severance line extending through the radially outer portion of the tab 34 and thereby leaving the attachment tongue 37 attached integrally in one piece with the radially inner free end portion of the bolt-on tab. In addition, the attachment tongue 37 is axially inwardly off-set relative to the bolt-on tab, this being accomplished by insetting the entire radially inner free end portion of the bolt-on tab by means of angular insetting flange connecting portions 38 alongside the ends of the severance lines for the tongues 37 and thus generally circumferentially aligned with the radially inner attached ends of the attachment tongues. These offsetting flanges afford reinforcing bends in the bolt-on tabs 34 which enhance the resilient stiffness thereof. As a result of this arrangement, as the respective attaching bolt 20 is drawn up against the attaching tongue 37, there is a tendency of the tongue to swing resiliently axially inwardly and radially inwardly but since the remainder of the bolt-on tab 34 tends to swing axially inwardly and radially outwardly there is substantial equalization of tendency toward radial displacement of the bolt-engaged margins of the bolt hole 35, while the full range of axially inward resilient tensioning deflection of the bolt-on tab 34 is permitted.

In applying the cover member 29 over the outer side of the wheel, it is circumferentially oriented with respect to a valve stem 39 (FIG. 1) to project through a valve stem aperture 40 suitably provided in the cover portion 31 in such relation as to provide for alignment of the bolt-on tabs 34 with their appropriate attachment bolts. After effecting such orientation, the cover member 29 is held substantially centered on the wheel by engagement of the outer marginal flange 30 thereof with the tire rim terminal flange 27. The cover-retaining bolts 20 are then secured through the bolt apertures 35 in the attachment tongues 37 and drawn up tight by means of a suitable wrench, for which the edges of the bolt-on tabs 34 defining the severance lines for the tongues 37 afford ample clearance. As the bolts 20 are run down into tight wheel-retaining relation to the bolt-on flange 18 of the wheel, the bolt-on tabs 34 are resiliently flexed axially inwardly and placed under substantial tensioning stress which pulls the cover member 29 firmly axially inwardly against the engaged portion of the wheel, namely the terminal flange 27. Due to the resilience of the attachment tabs 34 any weaving or other flexing movements of the wheel as may be encountered in running service of the wheel are readily accommodated since the cover can follow the movements of the tire rim relative to the wheel body and more particularly the bolt-on flange 18 which is rigidly held by the bolts 20 against the axle flange 21.

An advantageous feature of having the bolt-on flange structure of the cover member 29 provided with the resilient bolt-on tabs 34 resides in that thereby a rigid ornamental construction of the cover member 29 is enabled. Thus, a series of radially extending circumferentially spaced rigid ornamental and reinforcing ribs 41 may be provided running generally radially on the cover member portion 31. It will be appreciated that such ribs preclude any axial flexibility in the cover portion 31 which comprises the principal radial extent of the cover member 29.

A central crown cap cover member 42 is provided for enclosing the central bolt-on flange portion of the cover member 29 and the axle hub 22. In a desirable form, the cap member 42 has an annular side wall 43 provided with terminal retaining flange structure comprising a generally radially and axially outwardly turned narrow attachment and seating flange 44 (FIG. 2) engageable retainingly at its edge behind a generally radially and axially inwardly facing shoulder 45 defining an inset seat 47 for the flange 44 on the cover member 29 in the radially inner extremity portion of the intermediate cover portion 31 at juncture with the axial flange 32.

Figure 5:
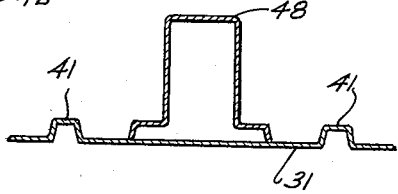
FIGURE 5 is an enlarged fragmentary sectional detail view taken substantially on the line V—V of FIGURE 1.

In addition, the cap cover member 42 has a circumferentially spaced plurality of integral radially outwardly extending spoke arms 48 which are constructed and arranged to lie against the cover portion 31 in complementary relation (FIGS. 1 and 5). To accommodate the arms 48, certain of the ribs 41 are omitted on the cover portion 31, as best seen in FIG. 3. The terminal extremities or free ends of the arms 48 lie adjacent to the radially outer limit of the sloping cover portion 31 and adjacent to an axially outwardly projecting annular pry-off rib 49 so that a pry-off tool can be engaged against the rib 49 behind the tip of any selected one of the arms 48 to pry the cap member 42 free from the cover member 29.

Application of the cover member 42 to the cover member 29 is effected by snapping the segments of the retaining flange 44 between the arms 48 into retaining engagement behind the shoulder 45 on the cover member 29, there being, of course, a suitable variance in diameter between the tip of the flange 44 and the shoulder 45 to effect this.

Figure 6:
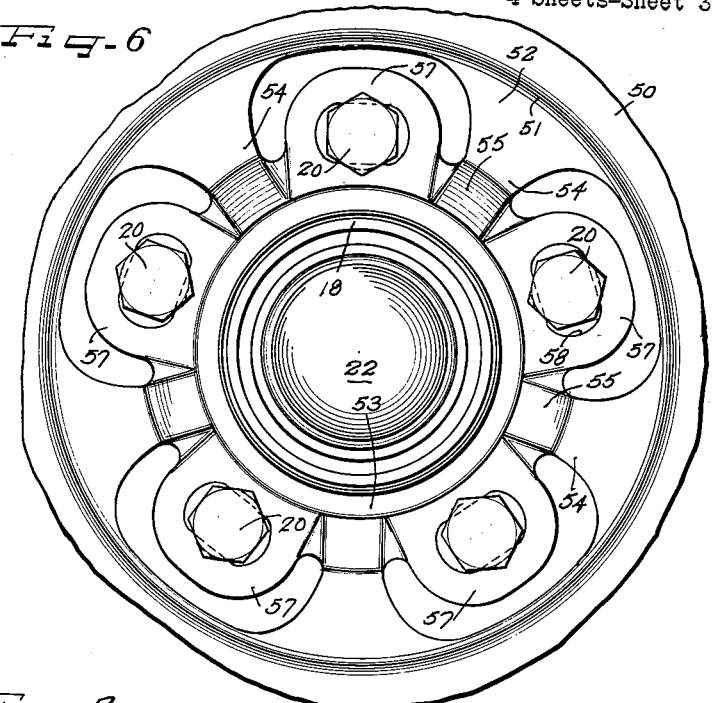
FIGURE 6 is a central elevational fragmentary detail view similar to FIGURE 3 and showing a modification.

In the modification of FIGURE 6, a cover member 50 which may in other respects be substantially the same as the cover member 29 is provided with a bolt-on flange structure which in basic concept is similar to the bolt-on flange structure of the cover member 29 but differs therefrom in certain structural details. Details of the wheel are the same as in FIGURE 2 and therefore identical reference numerals are applied to details of the wheel shown in FIGURE 6.

In this instance, the cover member 50 has an axially inwardly extending flange 51 which will be understood to be similar to the flange 32 of the cover member 29. Projecting radially inwardly from the axially inner end of the cover flange 51 is a bolt-on flange 52 having a continuous annular inner marginal portion 53 connected by resilient spoke-like portions 54 to the radially outer portions of the flange 52 at unispaced intervals aligned with the spaces between the wheel attaching bolts 20. The junctures between the spoke portions 54 and the inner portion 53 are provided by offsetting bend and reinforcing flange portions 55. Projecting radially outwardly from the central portion 53 of the bolt-on flange is a series of resilient attachment tab tongues 57 each having a bolt hole 58. In this instance there are as many of the attachment tongues 57 as there are attachment bolts, but if desired, of course, certain of the tongues 57 may be omitted similarly as in the form of FIGURES 1–5.

Upon drawing up of the attachment bolts 20 against the attachment tongues 57, not only do the tongues 57 resiliently yield axially inwardly, but the radially inner portion 53 of the bolt-on flange from which they emanate also yields axially inwardly, thus compensating for any tendency toward radial misalignment relative to the attachment bolts 20.

Figure 7:
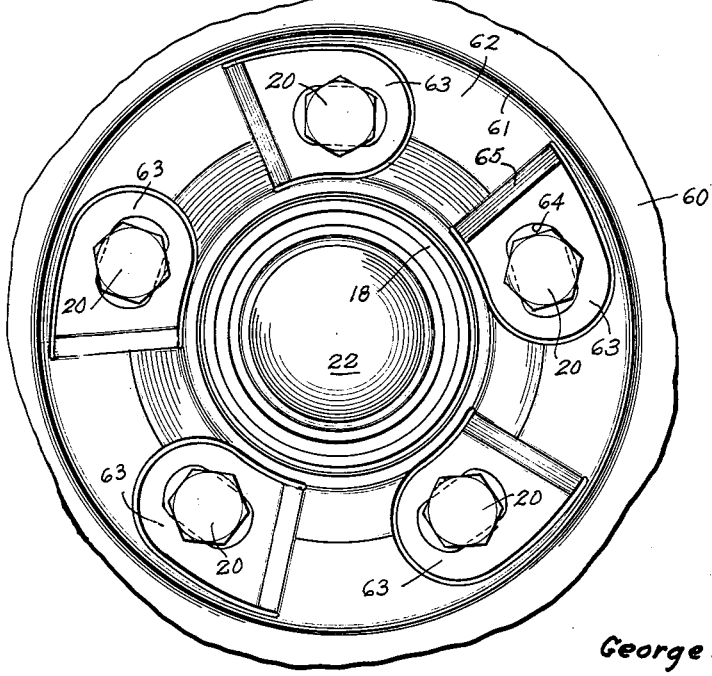
FIGURE 7 is a similar view showing another modification.

Referring to the modification of FIGURE 7, a cover member 60 which in other respects may be similar to the cover member 29 is provided with a bolt-on flange structure also having resiliently flexible adaptation on the order of the bolt-on flange structure of the cover 15. To this end, the cover member 60 has an axially inwardly extending annular flange 61 similar to the flange 32 of the cover member 29. Extending radially inwardly from the inner end of the flange 61 is a bolt-on flange structure 62 havin at circumferential intervals equal to at least some of the attachment bolts 20, but in this instance shown as all of such bolts, attachment tab tongues 63 provided with bolt holes 64. In this instance the tongues 63 extend in circumferential direction being severed from the bolt-on flange 62 except at circumferential sides of the tongues where an offsetting bend flange connection 65 with the flange 62 is provided. In this instance, since the bolt holes 64 are circumferentially elongated and resilient swinging of the tongues 63 as the screws 20 are drawn up tends to be in axially inward and circumferential direction, adequate compensation is afforded as the tongues are drawn inwardly.

In the modification of FIGURES 8 and 9, much the same structure is disclosed as in the form of FIGURES 1–5 and accordingly primed reference numerals indicate identical parts of the cover 15', unprimed reference numerals being applied to the wheel itself since therein no changes are indicated. It will be understood that all of the description relative to FIGURES 1–5 applies to this form of the invention except as otherwise described. Thus, in this instance the cover member 29' has on the radially inner end portions of the bolt-on tabs 34' centering finger extensions 70 extending radially inwardly and axially outwardly and engageable with the wheel hub 22. This feature is an assistance in maintaining the cover member 29' centered with respect to the wheel while applying the cover member to the wheel. It also, of course, helps to maintain the cover member in place while it is being detached from the wheel and until the cover member can be lifted away after the bolts 20 have been removed.

Another feature of difference of the cover 15' relative to the cover 15 resides in that the attachment flange 44' of the central closure cap cover member 42' engages behind retaining shoulders 71 provided on the inner ends of the spoke ribs 41', thus eliminating the need for a separate shoulder formation on the cover member 29'.

FIGURE 10 discloses a slight modification with respect to the manner in which the spoke arms of the central cover member coact with the supporting bolt attached cover member. It will be understood that all other features of the cover may be the same as in any of the previously described forms herein. In this modification, the cover member 29" has on the portion 31" thereof ribs 41" so spaced apart relative to the spoke arms 48" of the central cover member as to provide opposed spaced retaining shoulders 80 engageable in press-on, pry-off biting relation by the respective edges of circumferentially directed retaining flanges 81 directed from the sides of the respective spoke arms 48".

It will be understood that modifications and variations may be effected without departing from the scope of the novel concepts of the present invention.

I claim as my invention:

1. In a wheel structure including a wheel body having a central bolt-on flange receptive of attaching bolts to secure the same to a vehicle axle structure, a cover member for disposition over the outer side of the wheel including a portion to bear against a part of the wheel radially outwardly from said bolt-on flange, the cover member having a central bolt-on flange structure normally spaced a predetermined distance from the wheel body bolt-on flange and comprising a plurality of resiliently flexible bolt-on tab portions engageable by the attachment bolts and resiliently flexible axially inwardly relative to the cover member to be thereby placed under resilient tension and maintain the cover member firmly against said wheel portion, said tabs comprising radially inwardly extending resilient projections, said projections having partially struck out radially outwardly projecting attachment tongues resiliently flexible relative to the tabs on being drawn axially inwardly by the attachment bolts.

2. In a wheel structure including a wheel body having a central bolt-on flange receptive of attaching bolts to secure the same to a vehicle axle structure, a cover member for disposition over the outer side of the wheel including a portion to bear against a part of the wheel radially outwardly from said bolt-on flange, the cover member having a central bolt-on flange structure normally spaced a predetermined distance from the wheel body bolt-on flange and comprising a plurality of resiliently flexible bolt-on tab portions engageable by the attachment bolts and resiliently flexible axially inwardly relative to the cover member to be thereby placed under resilient tension and maintain the cover member firmly against said wheel portion, said tabs comprising struck out portions of a continuous annular flange having a radially inner edge of constant diameter.

3. In a wheel structure including a wheel body having a central bolt-on flange receptive of attaching bolts to secure the same to a vehicle axle structure, a cover member for disposition over the outer side of the wheel including a portion to bear against a part of the wheel radially outwardly from said bolt-on flange, the cover member having a central bolt-on flange structure normally spaced a predetermined distance from the wheel body bolt-on flange and comprising a plurality of resiliently flexible bolt-on tab portions engageable by the attachment bolts and resiliently flexible axially inwardly relative to the cover member to be thereby placed under resilient tension and maintain the cover member firmly against said wheel portion, said tabs comprising struck out portions of a continuous annular flange, said tabs projecting radially outwardly and said continuous annular flange having an inner marginal resilient portion from which the tabs emanate and which inner marginal portion by flexing axially inwardly as the tabs are flexed axially inwardly compensates for any tendency toward misalignment of bolt holes in the tabs relative to the bolts.

4. In a wheel structure including a wheel body having a central bolt-on flange receptive of attaching bolts to secure the same to a vehicle axle structure, a cover member for disposition over the outer side of the wheel including a portion to bear against a part of the wheel radially outwardly from said bolt-on flange, the cover member having a central bolt-on flange structure normally spaced a predetermined distance from the wheel body bolt-on flange and comprising a plurality of resiliently flexible bolt-on tap portions engageable by the attachment bolts and resiliently flexible axially inwardly relative to the cover member to be thereby placed under resilient tension and maintain the cover member firmly against said wheel portion, said tabs being partially struck out from a continuous annular flange and extending generally circumferentially and having bolt openings therethrough which the bolts are projected and engage edges defining the openings.

References Cited in the file of this patent

UNITED STATES PATENTS

| Re. 18,692 | Clark | Dec. 20, 1932 |
| D. 159,931 | Lyon | Aug. 22, 1950 |
| 2,116,216 | Lyon | July 18, 1939 |
| 2,491,506 | Lyon | Dec. 20, 1949 |
| 2,713,515 | Lyon | July 19, 1955 |
| 2,860,925 | Lyon | Nov. 18, 1958 |
| 3,001,826 | Lyon | Sept. 26, 1961 |

FOREIGN PATENTS

| 264,397 | Italy | Apr. 26, 1929 |